United States Patent
Yasukawa et al.

(10) Patent No.: US 11,845,377 B2
(45) Date of Patent: Dec. 19, 2023

(54) IN-VEHICLE SYSTEM AND IN-VEHICLE DEVICE

(71) Applicant: HITACHI ASTEMO, LTD., Hitachinaka (JP)

(72) Inventors: Takakiyo Yasukawa, Hitachinaka (JP); Tatsuhiko Monji, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 71 days.

(21) Appl. No.: 17/618,083

(22) PCT Filed: May 29, 2020

(86) PCT No.: PCT/JP2020/021291
§ 371 (c)(1),
(2) Date: Dec. 10, 2021

(87) PCT Pub. No.: WO2020/250711
PCT Pub. Date: Dec. 17, 2020

(65) Prior Publication Data
US 2022/0314866 A1 Oct. 6, 2022

(30) Foreign Application Priority Data
Jun. 12, 2019 (JP) .................. 2019-109660

(51) Int. Cl.
*B60Q 1/00* (2006.01)
*B60Q 1/14* (2006.01)

(52) U.S. Cl.
CPC ........... *B60Q 1/0023* (2013.01); *B60Q 1/143* (2013.01)

(58) Field of Classification Search
CPC ........ B60Q 1/143; B60Q 1/0023; B60Q 1/08; B60Q 2300/41; F21S 41/16; F21S 41/148; G01M 11/068
See application file for complete search history.

(56) References Cited

U.S. PATENT DOCUMENTS

| | | | |
|---|---|---|---|
| 10,654,402 B2 * | 5/2020 | Kambara | B60Q 1/143 |
| 2004/0105264 A1 * | 6/2004 | Spero | F21V 23/0471 362/276 |

(Continued)

FOREIGN PATENT DOCUMENTS

| | | | |
|---|---|---|---|
| EP | 3296155 A1 * | 3/2018 | |
| JP | 2010-235045 A | 10/2010 | |

(Continued)

OTHER PUBLICATIONS

International Search Report with English translation and Written Opinion issued in corresponding application No. PCT/JP2020/021291 dated Sep. 24, 2020.

*Primary Examiner* — Abdullah A Riyami
*Assistant Examiner* — Syed M Kaiser
(74) *Attorney, Agent, or Firm* — Foley & Lardner LLP

(57) ABSTRACT

It is possible to cope with a deviation of a relative position between a headlight and an in-vehicle camera. An in-vehicle system includes: an irradiation unit that irradiates an area other than a set light-shielding range with light; an imaging unit that images a range including an irradiation range of the light emitted by the irradiation unit to acquire a captured image; an object detection unit that detects a non-target object which is not to be irradiated with the light from the captured image; a direct irradiation prevention unit that calculates the light-shielding range on the basis of a position of the non-target object in the captured image and correction information, and sets the light-shielding range in the irradiation unit; a correction-time light-shielding range setting unit that sets the predetermined light-shielding range in the irradiation unit; and a correction calculation unit that calculates the correction information on the basis of the captured image when the correction-time light-shielding range (Continued)

setting unit sets the light-shielding range in the irradiation unit.

7 Claims, 18 Drawing Sheets

(56) References Cited

U.S. PATENT DOCUMENTS

| | | | | |
|---|---|---|---|---|
| 2012/0206050 A1* | 8/2012 | Spero | ................... | B60Q 1/1423 |
| | | | | 315/152 |
| 2016/0200238 A1* | 7/2016 | Mochizuki | ............ | F21S 41/148 |
| | | | | 362/523 |
| 2018/0170241 A1* | 6/2018 | Mizuno | ................ | F21S 41/663 |
| 2019/0225139 A1* | 7/2019 | Kambara | ................ | B60Q 1/143 |

FOREIGN PATENT DOCUMENTS

| | | | | | |
|---|---|---|---|---|---|
| JP | 2013-244893 A | | 12/2013 | | |
| JP | 2013244893 A | * | 12/2013 | ............ | B60Q 1/143 |
| JP | 2016/027977 A | | 2/2016 | | |
| JP | 2016-130109 A | | 7/2016 | | |
| JP | 2016130109 A | * | 7/2016 | ............... | B60Q 1/08 |
| JP | 2019-064348 A | | 4/2019 | | |
| JP | 2019064348 A | * | 4/2019 | | |
| WO | WO-2016208408 A1 | * | 12/2016 | ............... | B60Q 1/04 |

* cited by examiner

IN-VEHICLE SYSTEM AND IN-VEHICLE DEVICE

TECHNICAL FIELD

The present invention relates to an in-vehicle system and an in-vehicle device.

BACKGROUND ART

When the vehicle travels at night, it is desirable to emit headlights far away from the vehicle in order to check safety of the surroundings. However, when another vehicle is irradiated with the headlights, the environment recognition performance of the vehicle is deteriorated, and thus it is desirable not to irradiate another vehicle with the light of the headlight. PTL 1 discloses a vehicle headlight system including a lighting control device and a vehicle headlight that is lighting-controlled by the lighting control device. The lighting control device includes a light-shielding range setting unit that sets a light-shielding range according to a position of a target vehicle existing in front of a host vehicle on the basis of an image obtained by imaging the front of the host vehicle by a camera, a movement direction detection unit that detects a movement direction of the target vehicle in a horizontal direction on the basis of the image, a light-shielding range correction unit that applies a correction amount to the light-shielding range to expand a side of the movement direction and applies a correction amount to the light-shielding range to narrow a side opposite to the movement direction on the basis of the movement direction detected by the movement direction detection unit, and a headlight control unit that drives a headlight on the basis of the light-shielding range corrected by the light-shielding range correction unit. Each of the vehicle headlights can be individually turned on and off, and includes a light source unit having at least a plurality of light emitting elements arranged in a horizontal direction and a lens that projects light emitted from the light source unit to the front of the host vehicle.

CITATION LIST

Patent Literature

PTL 1: JP 2016-27977 A

SUMMARY OF INVENTION

Technical Problem

In the invention described in PTL 1, a deviation in a relative position between the headlight and the in-vehicle camera is not considered.

Solution to Problem

An in-vehicle system according to a first aspect of the present invention includes: an irradiation unit that irradiates an area other than a set light-shielding range with light; an imaging unit that images a range including an irradiation range of the light emitted by the irradiation unit to acquire a captured image; an object detection unit that detects a non-target object which is not to be irradiated with the light from the captured image; a direct irradiation prevention unit that calculates the light-shielding range on the basis of a position of the non-target object in the captured image and correction information, and sets the light-shielding range in the irradiation unit; a correction-time light-shielding range setting unit that sets the predetermined light-shielding range in the irradiation unit; and a correction calculation unit that calculates the correction information on the basis of the captured image when the correction-time light-shielding range setting unit sets the light-shielding range in the irradiation unit.

A correction device according to a second aspect of the present invention is a correction device which is mounted on a vehicle including an irradiation unit that irradiates an area other than a set light-shielding range with light and an imaging unit that images a range including an irradiation range of the light emitted by the irradiation unit to acquire a captured image. The correction device includes: an acquisition unit that acquires the captured image from the imaging unit; an object detection unit that detects a non-target object which is not to be irradiated with the light from the captured image; a direct irradiation prevention unit that calculates the light-shielding range on the basis of a position of the non-target object in the captured image and correction information, and sets the light-shielding range in the irradiation unit; a correction-time light-shielding range setting unit that sets the predetermined light-shielding range in the irradiation unit; and a correction calculation unit that calculates the correction information on the basis of the captured image acquired by the acquisition unit when the correction-time light-shielding range setting unit sets the light-shielding range in the irradiation unit.

A correction device according to a third aspect of the present invention is a correction device which is mounted on a vehicle including an irradiation unit that irradiates an area other than a set light-shielding range with light and an imaging unit that images a range including an irradiation range of the light emitted by the irradiation unit to acquire a captured image. The correction device includes an acquisition unit that acquires the captured image from the imaging unit. The vehicle further includes an object detection unit that detects a non-target object which is not to be irradiated with the light from the captured image, and a direct irradiation prevention unit that calculates the light-shielding range on the basis of a position of the non-target object in the captured image and correction information and sets the light-shielding range in the irradiation unit. The correction device further includes: a correction-time light-shielding range setting unit that sets the predetermined light-shielding range in the irradiation unit; and a correction calculation unit that calculates the correction information on the basis of the captured image acquired by the acquisition unit when the correction-time light-shielding range setting unit sets the light-shielding range in the irradiation unit.

Advantageous Effects of Invention

According to the present invention, it is possible to cope with the deviation of the relative position between the headlight and the in-vehicle camera.

DESCRIPTION OF EMBODIMENTS

Embodiment

Hereinafter, an embodiment of an in-vehicle system according to the present invention will be described with reference to FIGS. 1 to 15.

(Configuration)

Figure 1:
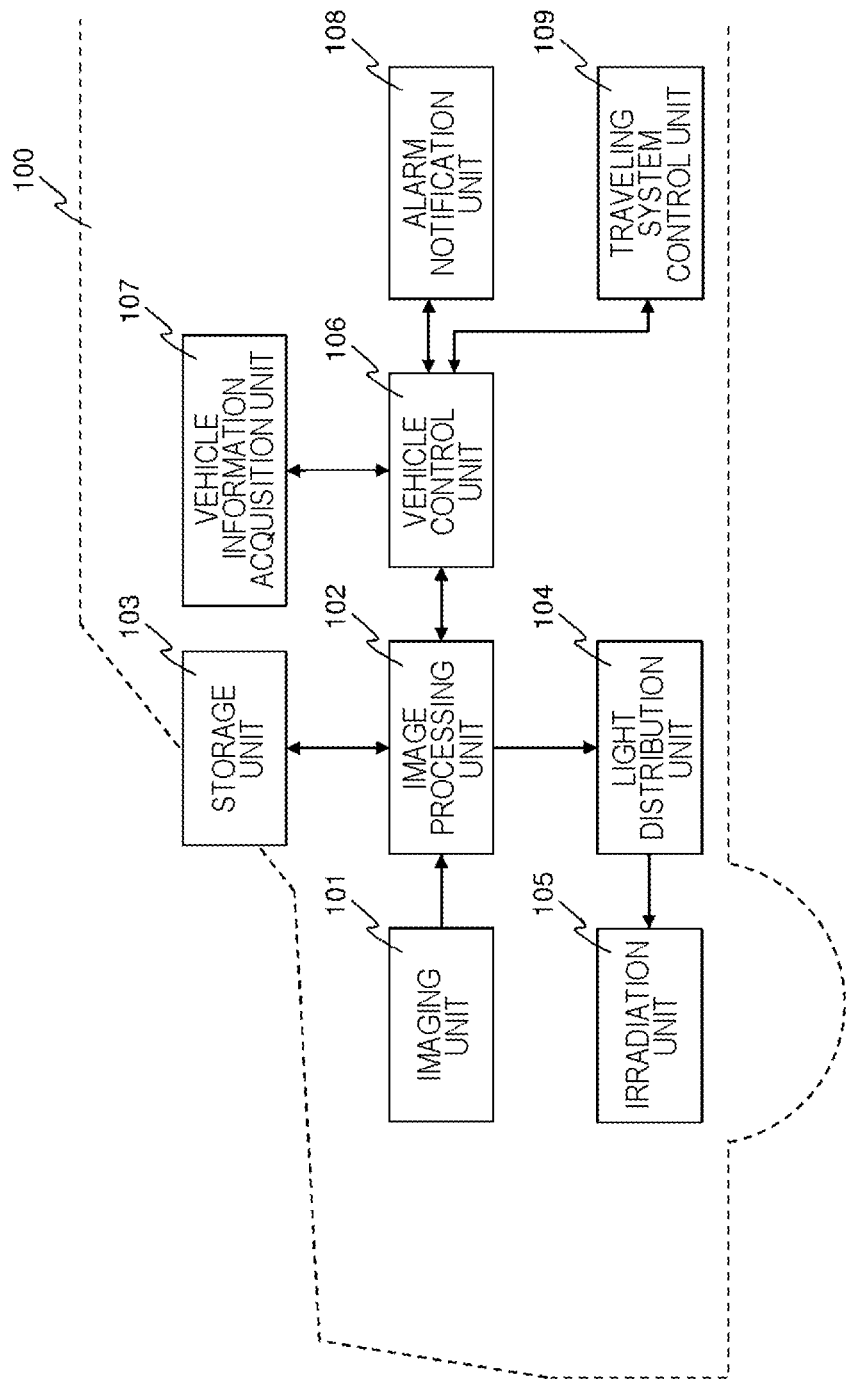
FIG. 1 is a block diagram of an in-vehicle system.

FIG. 1 is a block diagram of an in-vehicle system S according to the embodiment. The in-vehicle system S is mounted on a vehicle 100. The in-vehicle system S includes an imaging unit 101, an image processing unit 102, a storage unit 103, a light distribution unit 104, an irradiation unit 105, a vehicle control unit 106, a vehicle information acquisition unit 107, an alarm notification unit 108, and a traveling system control unit 109. Each of the devices configuring the in-vehicle system S exchanges information by digital communication or analog communication. The digital communication is, for example, communication conforming to a communication standard of a controller area network or IEEE 802.3. The analog communication is communication for transmitting information by the magnitude of current or voltage.

A positional relation between the imaging unit 101 and the light distribution unit 104 is determined in advance by design. The imaging unit 101 and the light distribution unit 104 are fixed to the vehicle 100 according to a predetermined setting. However, since it is considerably difficult to fix the imaging unit and the light distribution unit without any error, in this embodiment, mounting is performed while allowing some error, and as described later, a deviation in the positional relation between the imaging unit 101 and the light distribution unit 104 is corrected by software. This correction will be described in detail later.

The imaging unit 101 is a monocular camera, a stereo camera, or the like. The imaging unit 101 images the outside including at least the front of the vehicle 100, and transfers the captured image obtained by the imaging to the image processing unit 102. The image processing unit 102 is, for example, an electronic control unit (ECU). The image processing unit 102 outputs, to the imaging unit 101, setting information such as imaging timing and imaging time related to imaging. A detailed configuration of the image processing unit 102 will be described later. The storage unit 103 is a nonvolatile storage device, for example, a flash memory. The storage unit 103 stores a cutting position or the like necessary for image processing among the captured images acquired by the imaging unit 101.

The light distribution unit 104 is, for example, an ECU. The light distribution unit 104 designates the LED to be turned on in the irradiation unit 105 such that the irradiation unit 105 emits a proof to an area except for the area where the image processing unit 102 has detected the vehicle or the like. The irradiation unit 105 is a headlight that irradiates the front of vehicle 100. The irradiation unit 105 includes a plurality of LEDs, that is, light emitting diodes, and can control an area to be irradiated with light by selecting an LED to emit light. The irradiation unit 105 emits illumination light by turning on the LED designated by the light distribution unit 104. Hereinafter, irradiating the vicinity of the vehicle 100 is referred to as a "low beam", and irradiating a distant place of the vehicle 100 is referred to as a "high beam".

The vehicle control unit 106, the vehicle information acquisition unit 107, the alarm notification unit 108, and the traveling system control unit 109 are, for example, ECUs. The vehicle control unit 106 acquires the state and information of the vehicle 100 from the image processing unit 102, the vehicle information acquisition unit 107, the alarm notification unit 108, and the traveling system control unit 109, and provides each unit with appropriate operation information. For example, the vehicle control unit 106 transfers warning information to the alarm notification unit 108 on the basis of a captured image and information related to vehicle traveling, and transfers a steering angle, a deceleration amount, and the like related to braking to the traveling system control unit 109.

The vehicle information acquisition unit 107 acquires information such as a speed and a steering angle related to a traveling condition of the vehicle 100 and transfers the information to the vehicle control unit 106. The alarm notification unit 108 receives a warning related to the traveling state of the vehicle 100 from the vehicle control unit 106, and calls attention to the driver of the vehicle 100 by displaying an image on a liquid crystal panel or the like or transmitting a voice/warning sound by a speaker or the like. The traveling system control unit 109 performs steering, brake braking, and the like on the basis of information such as a steering angle and a deceleration amount related to the traveling state of the vehicle 100 from the vehicle control unit 106.

Note that the configuration illustrated in FIG. 1 is an example, and any configuration may be used as long as the same function can be implemented. For example, a plurality of configurations may be integrated into one, or one configuration may be separated into a plurality of configurations. For example, the storage unit 103 may be included in the image processing unit 102, or the image processing unit 102 may be divided into a plurality of configurations.

(Image Processing Unit)

Figure 2:
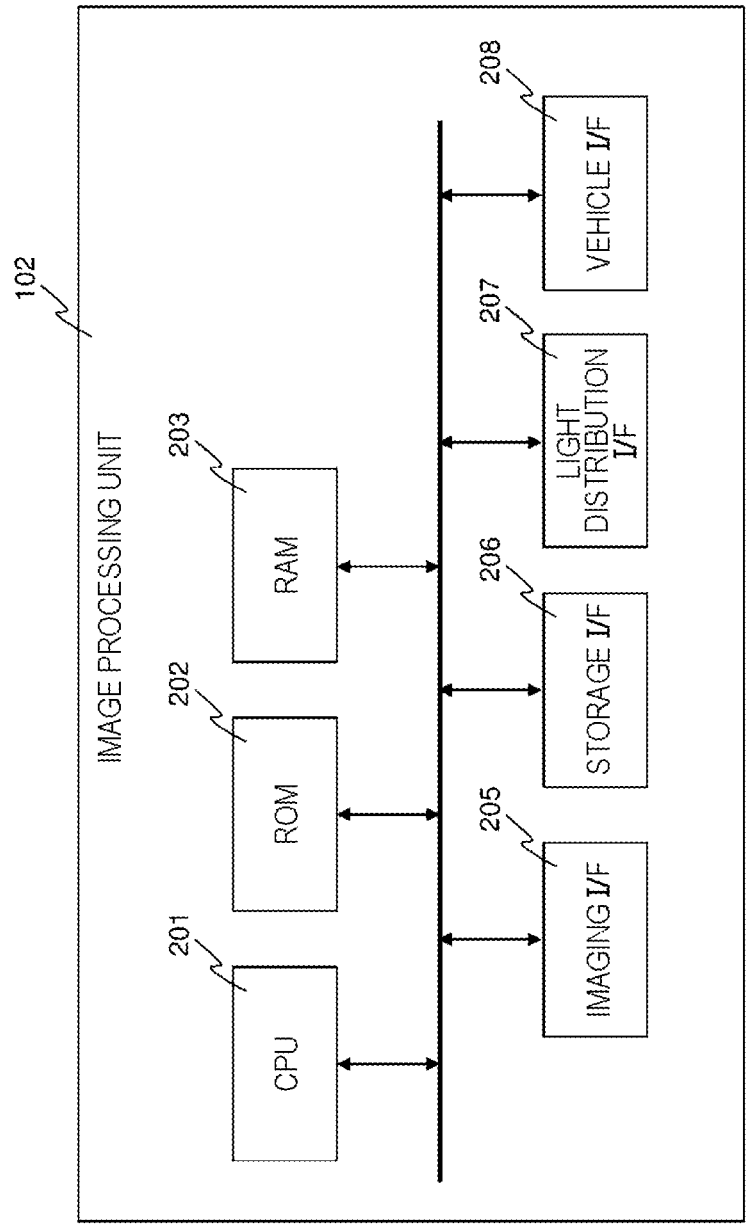
FIG. 2 is a block diagram illustrating a hardware configuration of an image processing unit.

FIG. 2 is a block diagram illustrating a hardware configuration of the image processing unit 102. The image processing unit 102 includes a CPU 201 that is a central processing unit, a ROM 202 that is a read-only storage device, a RAM 203 that is a readable/writable storage device, an imaging I/F 205, a storage I/F 206, a light distribution I/F 207, and a vehicle I/F 208. The CPU 201 develops a program stored in the ROM 202 in the RAM 203 and executes the program, thereby implementing functions described later. Each of the imaging I/F 205, the storage I/F 206, the light distribution I/F 207, and the vehicle I/F 208 is a communication interface with the imaging unit 101, the storage unit 103, the light distribution unit 104, and the vehicle control unit 106.

Figure 3:
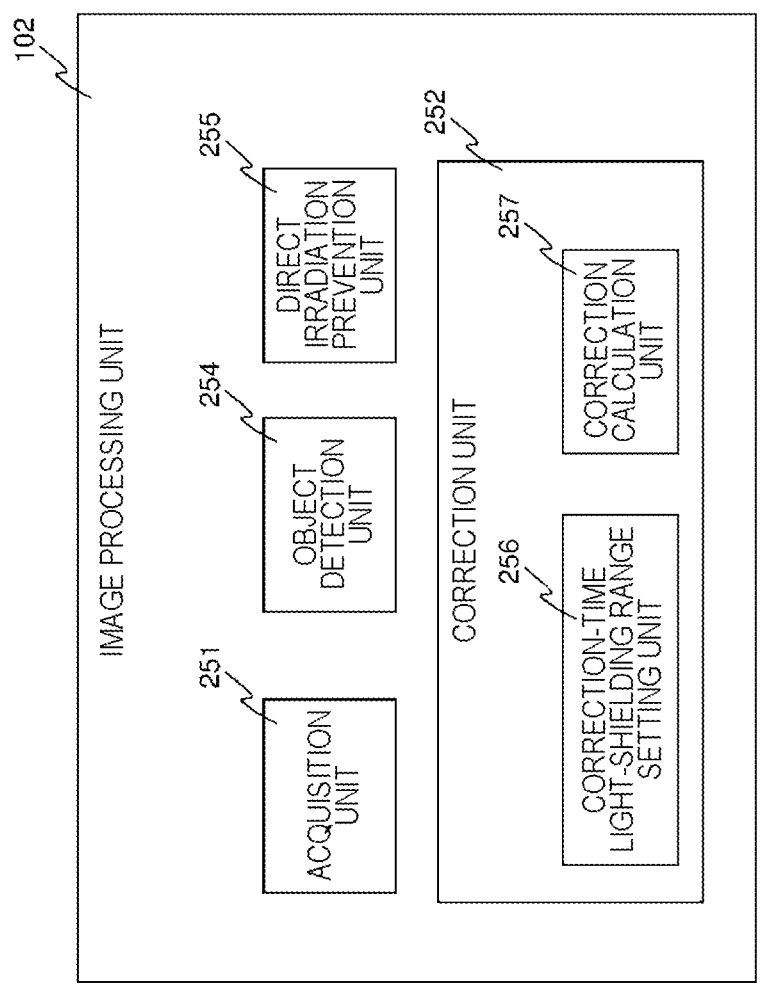
FIG. 3 is a block diagram illustrating a functional configuration of the image processing unit.

FIG. 3 is a block diagram illustrating a functional configuration of the image processing unit 102. The image processing unit 102 includes, as functions thereof, an acquisition unit 251, a correction unit 252, an object detection unit 254, and a direct irradiation prevention unit 255. The acquisition unit 251 acquires a captured image from the imaging unit 101. The correction unit 252 includes a correction-time light-shielding range setting unit 256 and a correction calculation unit 257. The correction-time light-shielding range setting unit 256 sets a predetermined light-shielding range in the irradiation unit 105. When the correction-time light-shielding range setting unit 256 sets a light-shielding range in the irradiation unit 105, the correction calculation unit 257 calculates correction information on the basis of the captured image acquired by the acquisition unit 251.

The object detection unit 254 detects a non-target object not to be irradiated with light from the captured image. The direct irradiation prevention unit 255 calculates the light-shielding range on the basis of the position of the non-target object in the captured image and the correction information, and sets the light-shielding range in the irradiation unit 105. Incidentally, hereinafter, the function implemented by the direct irradiation prevention unit 255 is referred to as a "direct irradiation prevention function", and the function implemented by the correction calculation unit 257 is referred to as a "correction function".

(Imaging Unit)

Figure 4:
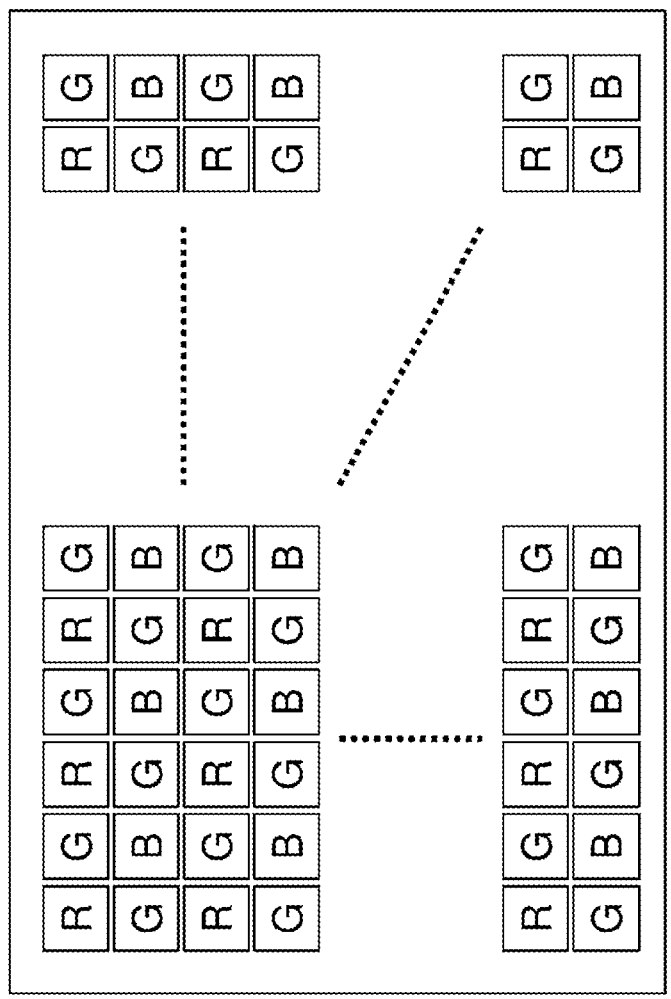
FIG. 4 is a diagram illustrating an example of an array of light receiving elements included in an imaging unit.

FIG. 4 is a diagram illustrating an example of an array of light receiving elements included in the imaging unit 101. In FIG. 4, "R" indicates a light receiving element that detects a red wavelength band, "G" indicates a light receiving element that detects a green wavelength band, and "B" indicates a light receiving element that detects a blue wavelength band. Each light receiving element is provided with a filter, and only a specific wavelength band is detected by the filter. The array illustrated in FIG. 4 is suitable for acquiring a color image. The array of the imaging elements illustrated in FIG. 4 is handled as one set including two elements in each of vertical and horizontal directions and four elements in total. In order to reconfigure each component of RGB projected on each element area of this one set of elements, the imaging unit 101 performs a complementation process. In the simplest complementation process, an average value of the components of the wavelength bands that are closest to each other is adopted. For example, the G component of the R element in FIG. 4 is an average value of four G elements obliquely close to each other. Similarly, the B component is an average value of two upper and lower B elements.

Figure 5:
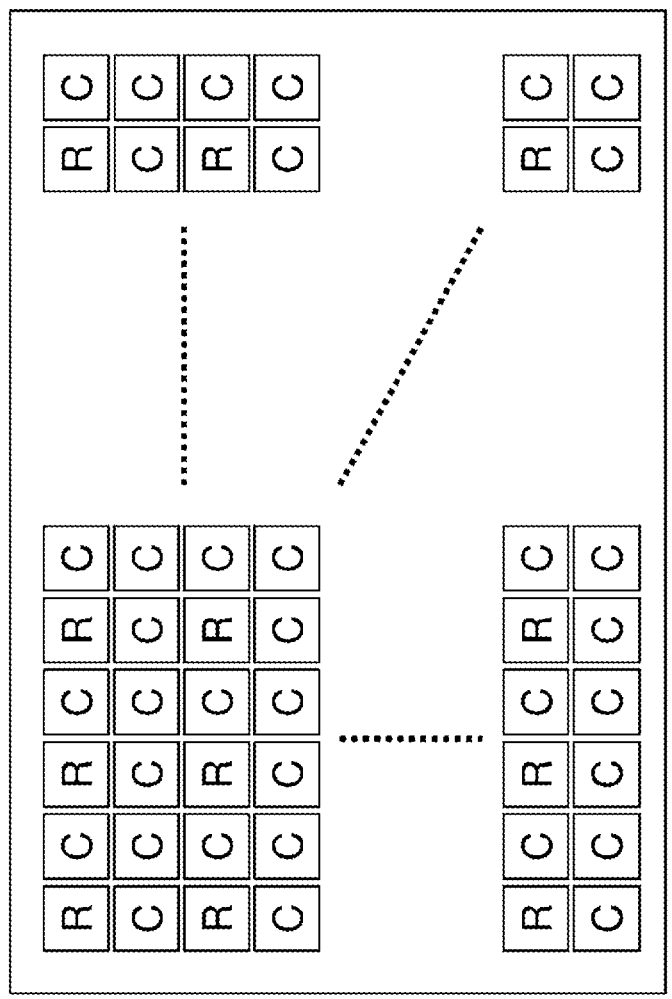
FIG. 5 is a diagram illustrating another example of the array of the light receiving elements included in the imaging unit.

FIG. 5 is a diagram illustrating another example of the array of the light receiving elements included in the imaging unit 101. The example illustrated in FIG. 5 is an example in a case where it is not necessary to strictly separate color components. "C" in FIG. 5 indicates a clear pixel to which no filter is applied. Since the clear pixel has no color restriction, it is possible to receive all frequency components, and the complementation process or the like can be minimized for the light receiving element of the color pixel, so that a dynamic range may be improved. Note that the red pixel is necessary for recognition of a taillight or the like, and is desirably provided individually.

(Direct Irradiation Prevention Function)

In this embodiment, the image processing unit 102 has a direct irradiation prevention function described below. The direct irradiation prevention function is a function of preventing irradiation of surrounding vehicles with a high beam. The direct irradiation prevention function includes following three processes. First, in a first process, a vehicle is detected from a captured image acquired by the imaging unit 101, in a second process, a light-shielding range of not being irradiated with a high beam is determined, and in a third process, an area other than the light-shielding range is irradiated. The direct irradiation prevention function and the necessity of correction will be described with reference to FIGS. 6 to 8.

Figure 6:
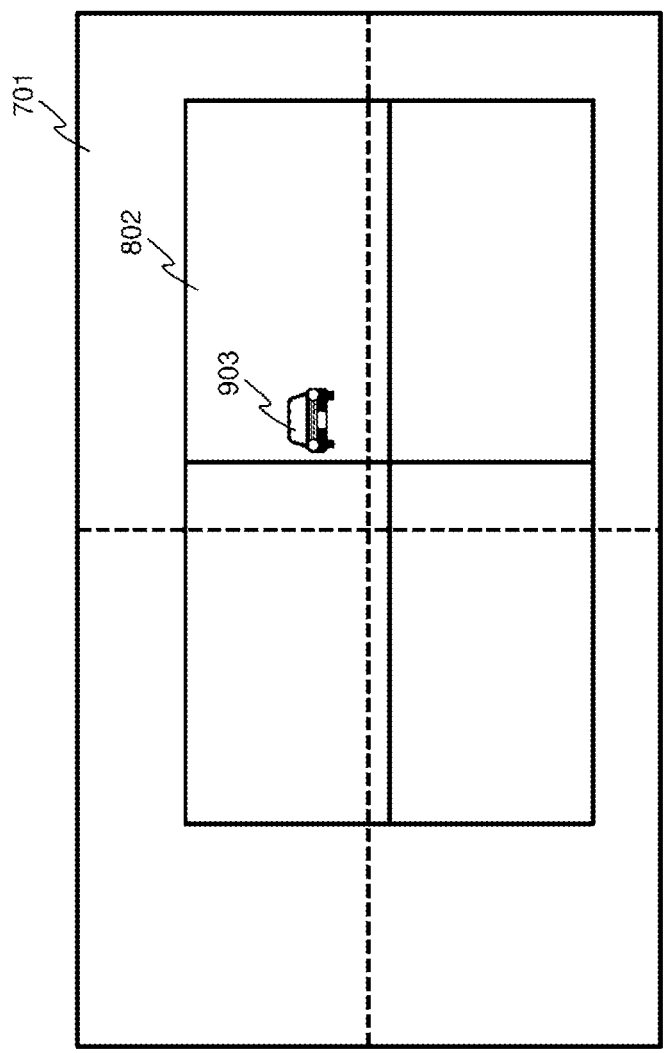
FIG. 6 is a diagram illustrating an example of a captured image.
Figure 7:
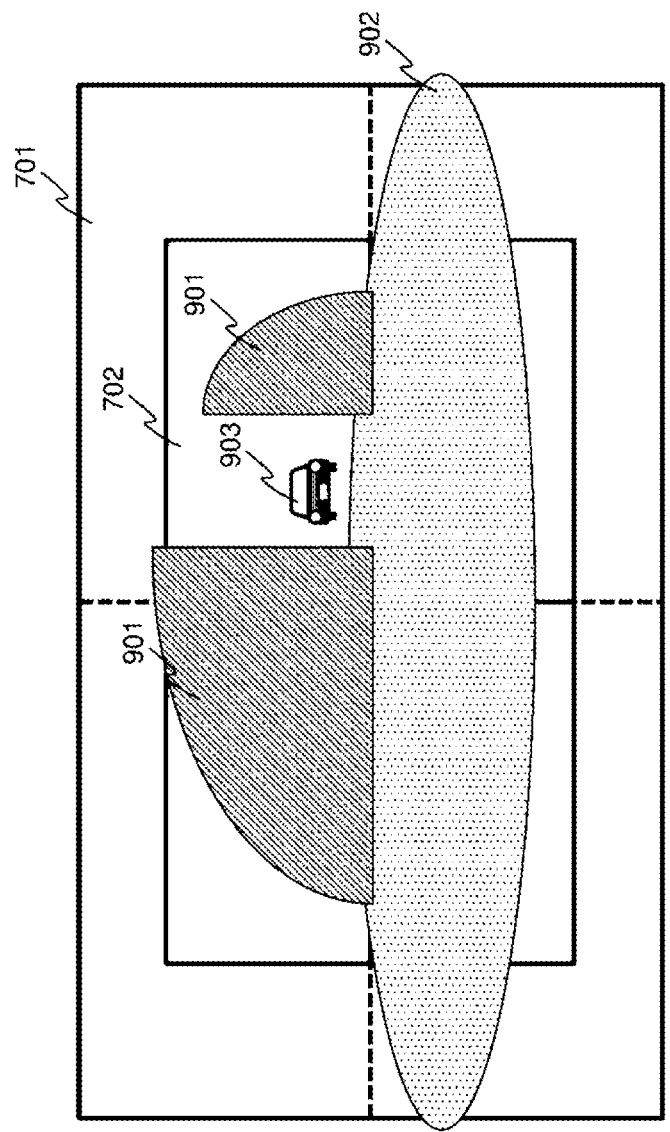
FIG. 7 is a diagram illustrating a case where a direct irradiation prevention function ideally functions.
Figure 8:
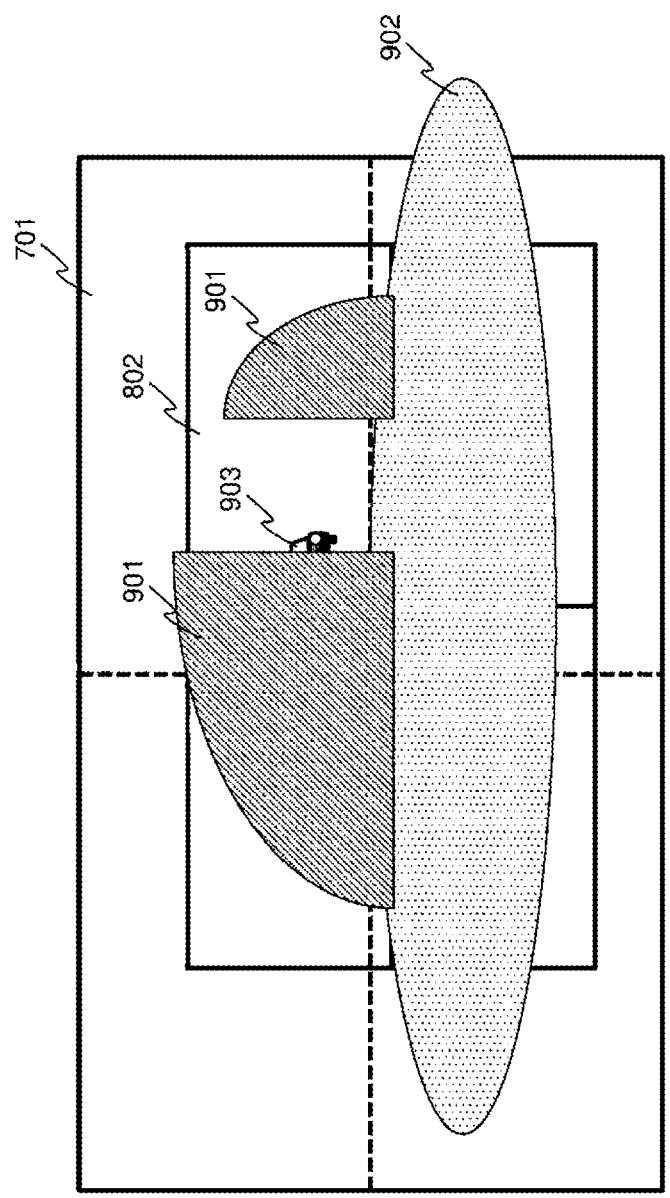
FIG. 8 is a diagram illustrating a case where a direct irradiation prevention function does not normally function.

FIG. 6 is a diagram illustrating an example of the captured image, FIG. 7 is a diagram illustrating a case where the direct irradiation prevention function ideally functions, and FIG. 8 is a diagram illustrating a case where the direct irradiation prevention function does not normally function. In FIG. 6, an oncoming vehicle 903 is imaged in front of the vehicle 100. A large square indicated by a reference sign 701 indicates the captured image. Note that a broken line dividing the square indicated by the reference sign 701 into four is described as an auxiliary line for convenience. A reference sign 802 will be described later. The oncoming vehicle 903 is imaged at a position slightly right of the front of the vehicle 100.

In FIG. 7, a reference sign 901 indicates a high beam, and a reference sign 902 indicates a low beam. In FIG. 7, the high beam is not emitted on a range of the oncoming vehicle 903, and the direct irradiation prevention function functions ideally. This is because the position of the oncoming vehicle 903 is detected from the captured image acquired by the imaging unit 101, and the irradiation unit 105 emits the high beam with the vicinity of the detected oncoming vehicle amount 903 as the light-shielding range. However, in a case where the mounting positions of the imaging unit 101 and the irradiation unit 105 are different from the design, a problem described below occurs unless any measure is taken.

That is, as illustrated in FIG. 8, the existing position of the oncoming vehicle 903 and the light-shielding range do not match, and a problem that the oncoming vehicle amount 903 is irradiated with the high beam may occur. In brief, this is because there is a deviation between the center position of the imaging range of the imaging unit 101 and the center position of the irradiating range of the irradiation unit 105. Therefore, in this embodiment, the deviation between the two is calculated in advance as correction information, and the correction information used in the calculation of the light-shielding range. Note that the correction information can take a plurality of forms, but in this embodiment, the correction information is treated as setting of a coordinate system of a recognition range in the captured image.

(Correction Process)

Figure 9:
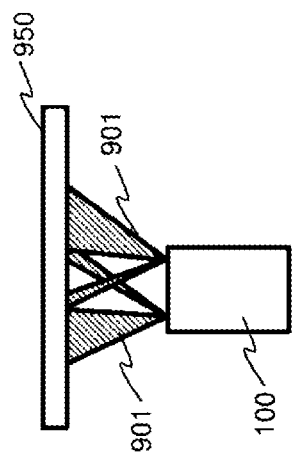
FIG. 9 is a diagram illustrating a state when a correction process is executed.

The correction process will be described with reference to FIGS. 9 to 13. The correction process is divided into two types which are horizontal correction for correcting a horizontal deviation and vertical correction for correcting a vertical deviation. FIG. 9 is a diagram illustrating a state where the correction process is executed. As illustrated in FIG. 9, the correction process is executed by stopping the vehicle 100 in the front of a wall 950. Furthermore, FIG. 9 illustrates a state where the horizontal correction of the correction process is executed, and a range excluding 20 degrees from the front of the vehicle 100 is irradiated with a high beam.

Figure 10:
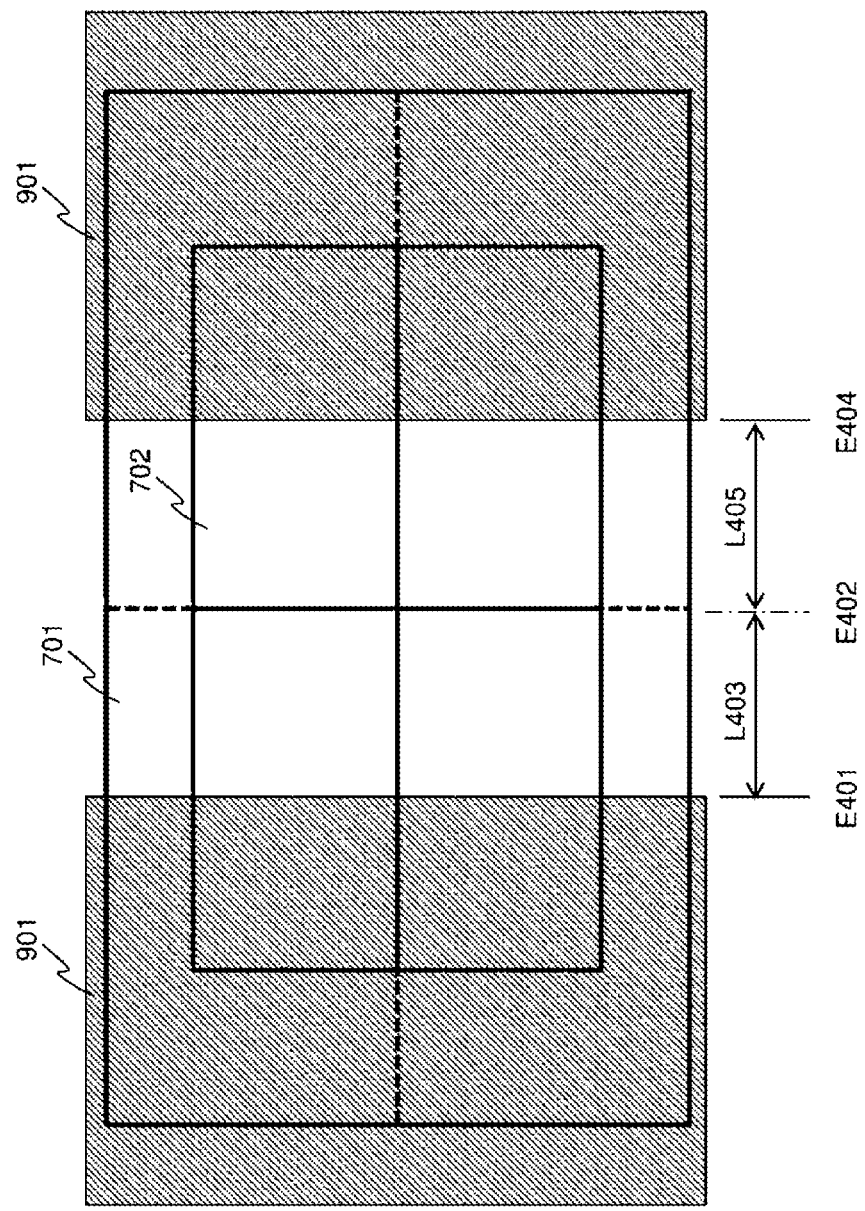
FIG. 10 is a view illustrating a captured image at the time of horizontal correction in a case where there is no deviation in a horizontal direction.
Figure 11:
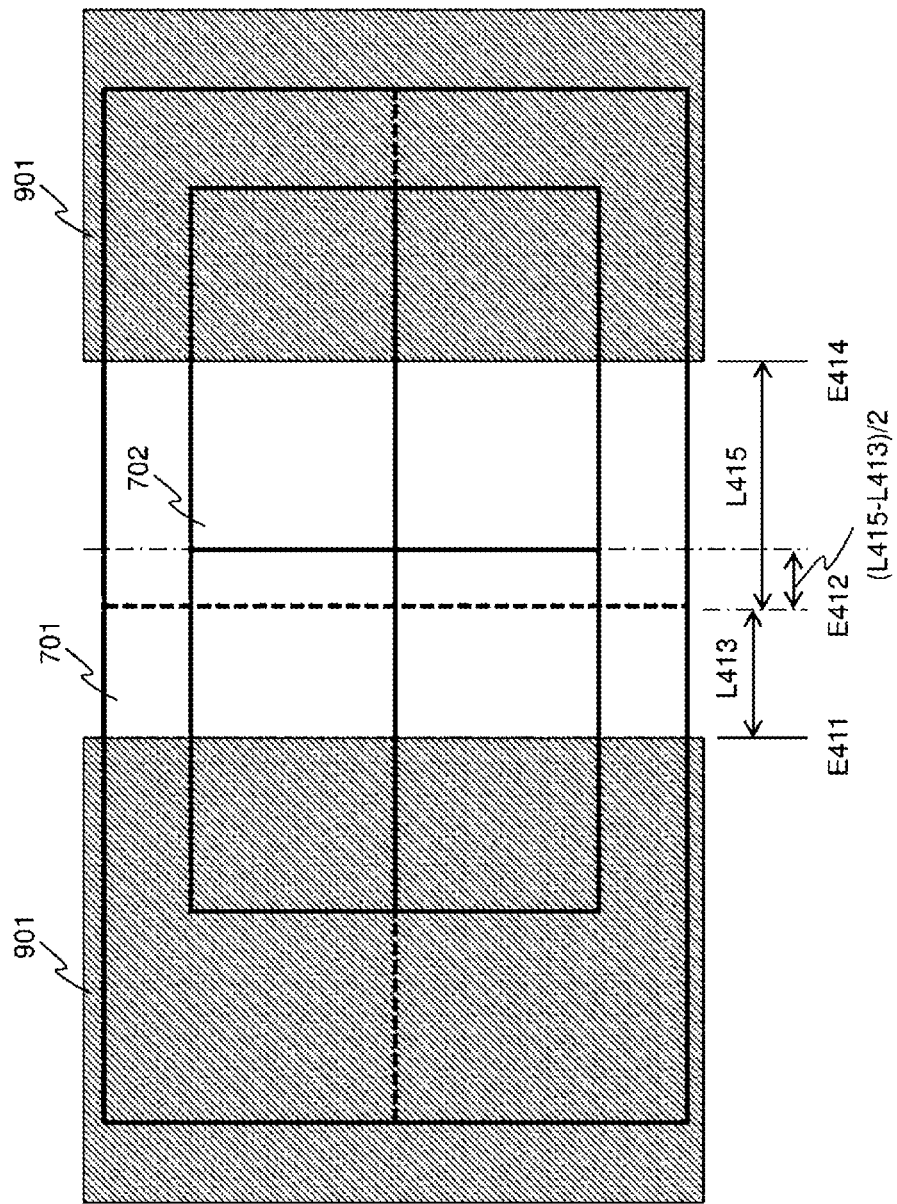
FIG. 11 is a diagram illustrating a captured image at the time of horizontal correction in a case where there is a deviation in the horizontal direction.

FIG. 10 is a view illustrating the captured image at the time of the horizontal correction in a case where there is no deviation in the horizontal direction, and FIG. 11 is a view illustrating the captured image at the time of the horizontal correction in a case where there is a deviation in the horizontal direction. In the horizontal correction, a predetermined angle, for example, a range of plus or minus 10 degrees around a vertical axis in the front of the vehicle 100 is set as a light-shielding range. In this case, when the positional relation between the imaging unit 101 and the light distribution unit 104 is the same as a design value, the captured image illustrated in FIG. 10 is obtained, and when the positional relation is deviated from the design value in the horizontal direction, the captured image illustrated in FIG. 11 is obtained. The reference sign 701 illustrated in FIGS. 10 and 11 represents the captured image similarly to FIG. 6 and the like, and the reference sign 702 represents the recognition range. Similarly to the reference sign 701, an auxiliary line for dividing the recognition range 702 into four is added for convenience of description.

In a case where there is no horizontal deviation between the imaging unit 101 and the light distribution unit 104, as illustrated in FIG. 10, the irradiation area of the high beam 901 appears line-symmetrically with respect to the vertical axis of the center of the captured image 701. Specifically, a distance L403 from an edge E401 to a center E402 of the irradiation area detected on the left side of the captured image 701 is equal to a distance L405 from an edge E404 to the center E402 of the irradiation area detected on the right side of the captured image 701. In this case, the correction unit 252 sets the correction amount in the horizontal direction to zero.

On the other hand, in a case where there is a horizontal deviation between the imaging unit 101 and the light distribution unit 104, as illustrated in FIG. 11, the irradiation area of the high beam 901 appears line-symmetrically with respect to a position shifted from the center of the captured image 701. Specifically, a distance L413 from an edge E411 to a center E412 of the irradiation area detected on the left side of the captured image 701 is not equal to a distance L415 from an edge E414 to the center E412 of the irradiation area detected on the right side of the captured image 701. In this case, the correction unit 252 sets half of a difference between L413 and L415 as the correction amount in the horizontal direction. Next, the vertical correction will be described.

Figure 12:
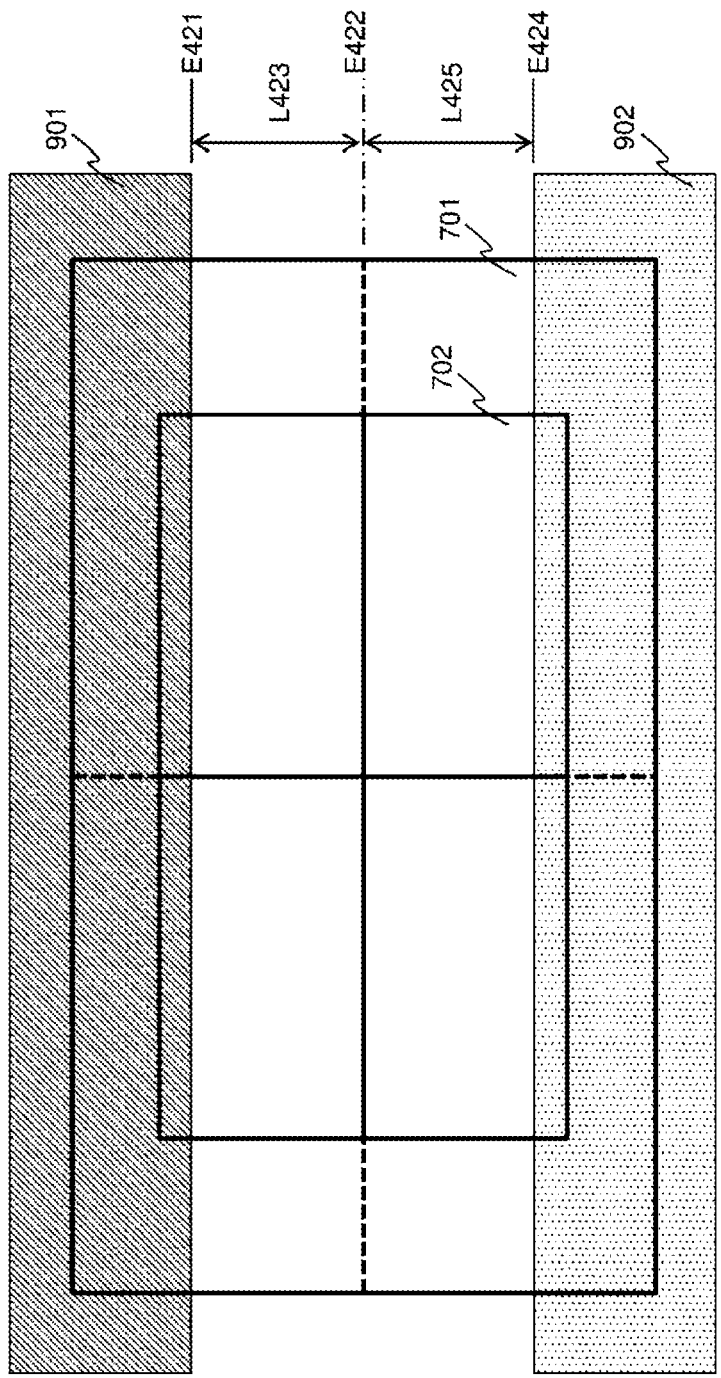
FIG. 12 is a view illustrating a captured image at the time of vertical correction in a case where there is no deviation in a vertical direction.
Figure 13:
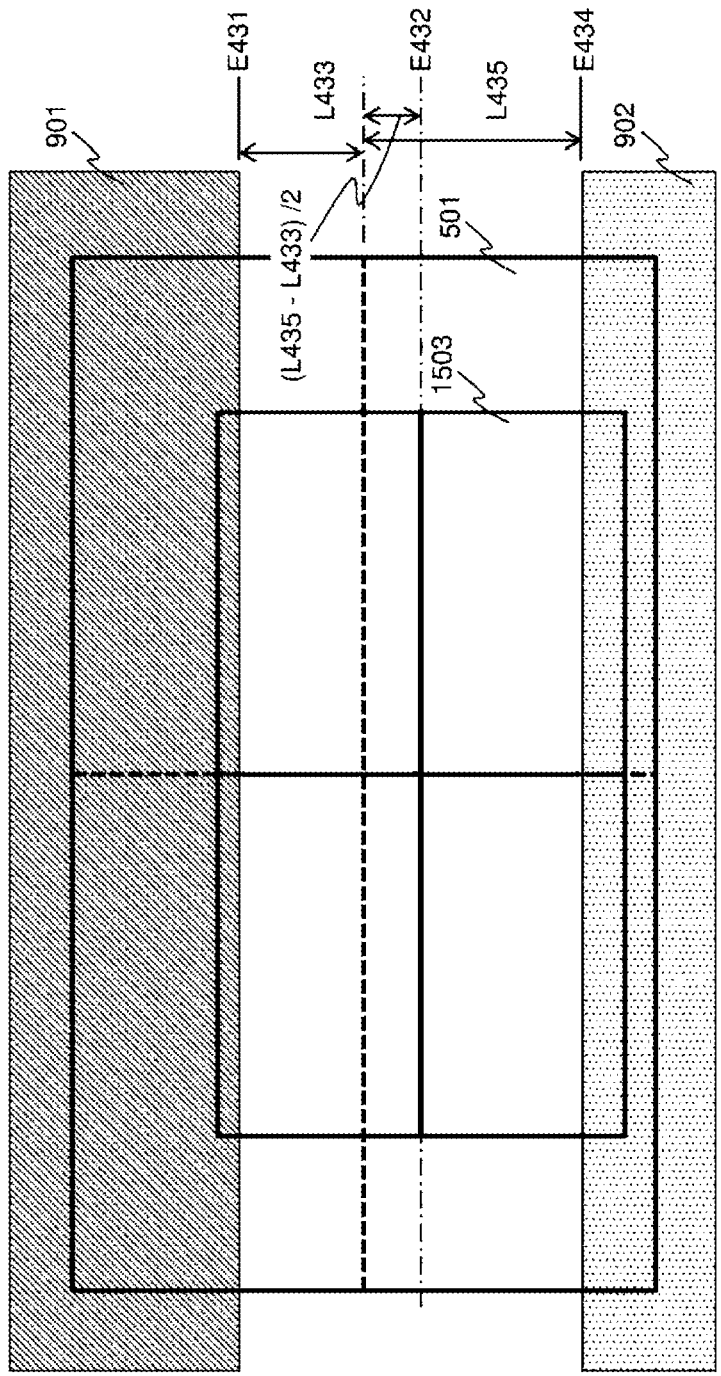
FIG. 13 is a diagram illustrating a captured image at the time of vertical correction in a case where there is a deviation in the vertical direction.

FIG. 12 is a diagram illustrating the captured image at the time of the vertical correction in a case where there is no deviation in the vertical direction, and FIG. 13 is a diagram illustrating the captured image at the time of vertical correction in a case where there is a deviation in the vertical direction. In the vertical correction, a predetermined angle, for example, a range of plus or minus 10 degrees around a horizontal axis in the front of the vehicle 100 is set as a light-shielding range. In this case, when the positional relation between the imaging unit 101 and the light distribution unit 104 is the same as a design value, the captured image illustrated in FIG. 12 is obtained, and when the positional relation is deviated from the design value in the vertical direction, the captured image illustrated in FIG. 13 is obtained.

In a case where there is no vertical deviation between the imaging unit 101 and the light distribution unit 104, as illustrated in FIG. 12, the irradiation area of the high beam 901 and the irradiation area of the low beam 902 appear line-symmetrically with respect to the horizontal axis of the center of the captured image 701. Specifically, a distance L423 from an edge E421 to a center E422 of the irradiation area detected on the upper side of the captured image 701 is equal to a distance L425 from an edge E424 to the center E422 of the irradiation area detected on the lower side of the captured image 701. In this case, the correction unit 252 sets the correction amount in the vertical direction to zero.

On the other hand, in a case where there is a vertical deviation between the imaging unit 101 and the light distribution unit 104, as illustrated in FIG. 13, the irradiation area of the high beam 901 and the irradiation area of the low beam 902 appear line-symmetrically with respect to a position shifted from the center of the captured image 701. Specifically, a distance L433 from an edge E431 to a center E432 of the irradiation area detected on the upper side of the captured image 701 is not equal to a distance L435 from an edge E434 to the center E432 of the irradiation area detected on the lower side of the captured image 701. In this case, the correction unit 252 sets half of a difference between L433 and L435 as the correction amount in the vertical direction.

Note that, in the examples illustrated in FIGS. 10 to 13, the irradiation area and the non-irradiation area are easily distinguished from each other since the drawings are schematic diagrams, but actually, the irradiation area and the non-irradiation area are distinguished from each other by a magnitude relationship between luminance of each pixel in the captured image and a threshold value. At this time, it is conceivable that when the brightness of the surrounding environment changes, the brightness of the captured image changes, and the position on the image exceeding the threshold value changes. However, in this embodiment, since the non-irradiation area is set symmetrically, even in a case where the position on the image exceeding the threshold value changes, the non-irradiation area changes symmetrically, so that the influence can be canceled. Specifically, since L413 and L415 illustrated in FIG. 11 similarly increase or decrease due to the change in the ambient brightness, the value of (L415-L413) does not change and is not substantially affected by the change in the ambient brightness.

(Flowchart of Correction Process)

Figure 14:
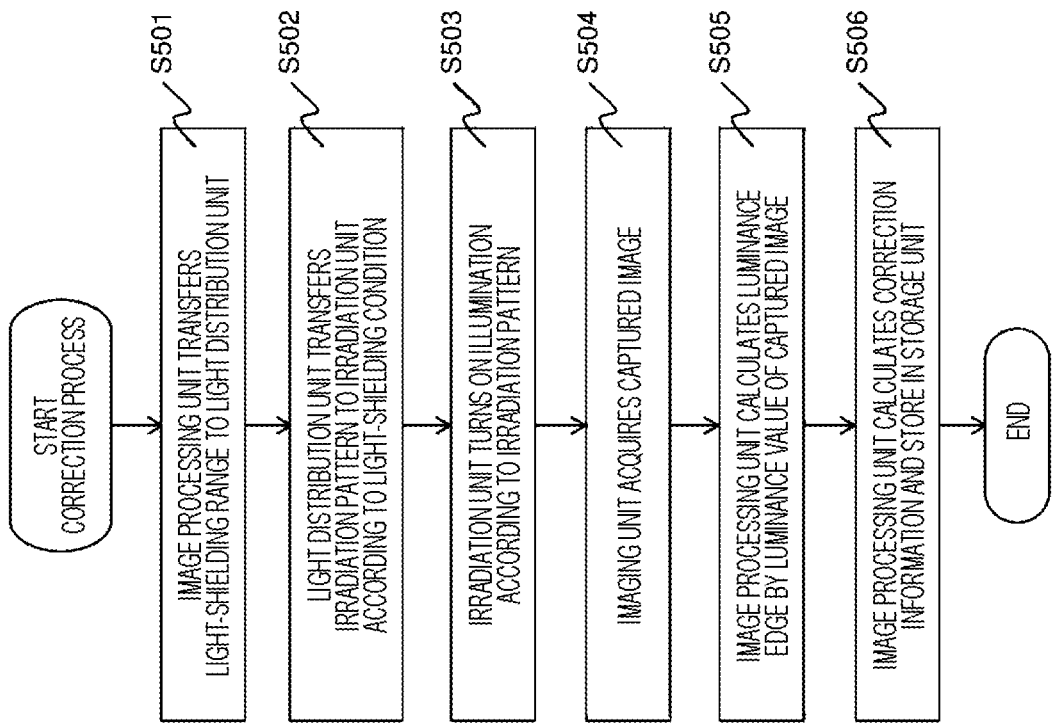
FIG. 14 is a flowchart illustrating the correction process.

FIG. 14 is a flowchart illustrating the correction process. The correction process is executed, for example, at the time of factory shipment of the vehicle 100 or at the time of inspection by a dealer. However, the flowchart illustrated in FIG. 14 illustrates only correction process in one direction, for example, a horizontal direction. Actually, the image processing unit 102 performs correction in both the horizontal direction and the vertical direction.

First, the image processing unit 102 sets a range of plus or minus 10 degrees in front of the front of vehicle 100 as a light-shielding range, and transfers information of the light-shielding range to the light distribution unit 104 (S501). Next, according to the light-shielding range of 10 degrees on the left and right, the light distribution unit 104 creates an irradiation pattern and transfers the irradiation pattern to the irradiation unit 105 (S502). The irradiation unit 105 turns on the illumination according to the irradiation pattern created by the light distribution unit 104 (S503).

FIG. 9 illustrates a situation where S503 has been executed as viewed from the top of the vehicle 100.

Next, the imaging unit 101 acquires a captured image (S504). The captured image at this time is illustrated in FIGS. 10 and 11. From the captured image, the image processing unit 102 calculates edges of luminance where the luminance greatly changes, for example, E411 and E414 in FIG. 11 (S505). For the calculation of the luminance edge, determination based on a threshold value may be used on the basis of a luminance difference between a bright portion and a dark portion, or determination based on pattern matching may be used by using a luminance gradient of a luminance edge portion. Finally, the image processing unit 102 calculates correction information from the calculated luminance edge, and stores the correction information in the storage unit 103 (S506). The above is the description of the correction process.

(Flowchart of Direct Irradiation Prevention Process)

Figure 15:
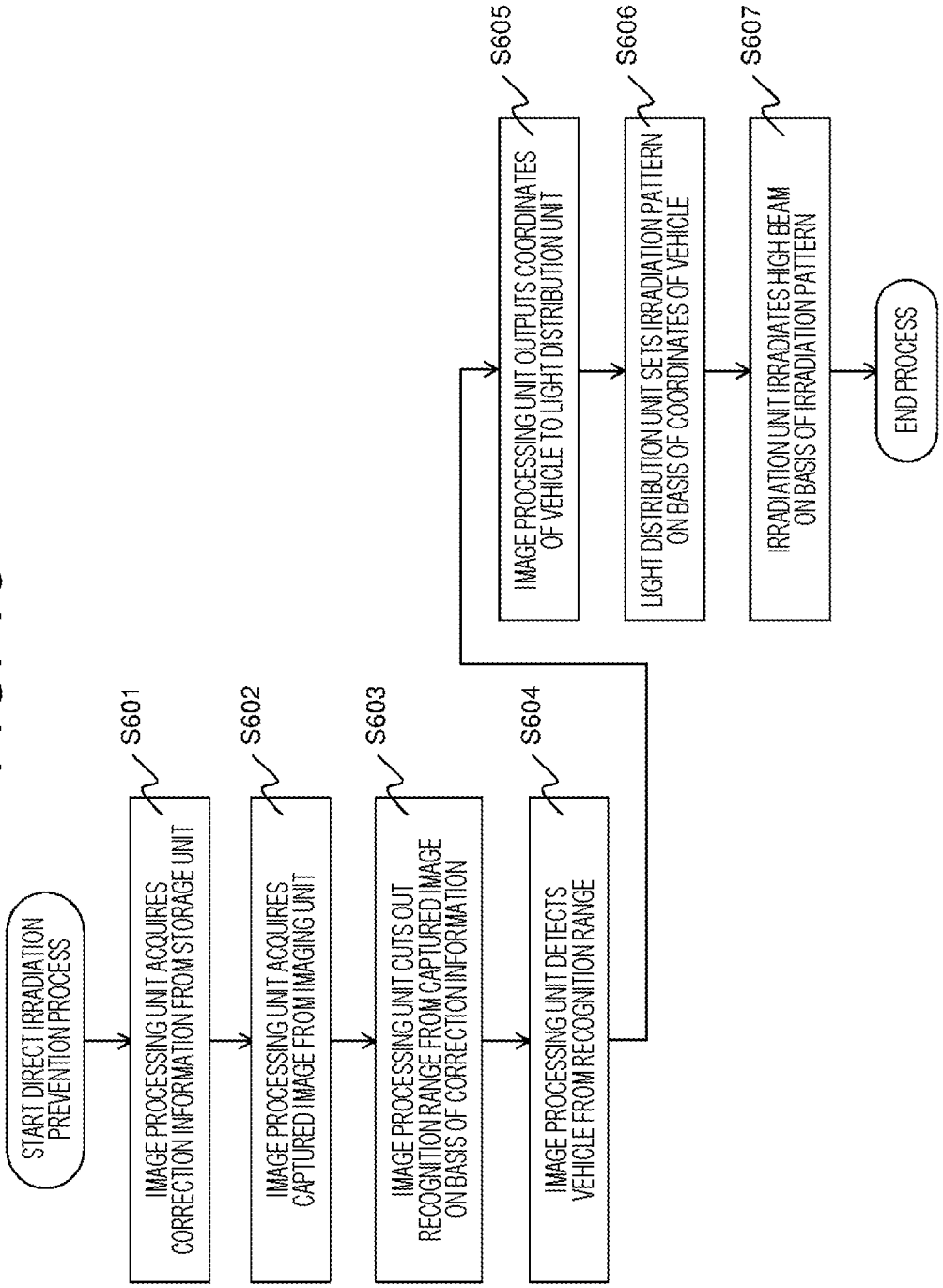
FIG. 15 is a flowchart illustrating a direct irradiation prevention process.

FIG. 15 is a flowchart illustrating a direct irradiation prevention process. This process is executed, for example, every 100 ms whenever the headlight of the vehicle 100 is turned on. First, the image processing unit 102 reads the correction information stored in the storage unit 103 (S601).

Next, the image processing unit 102 acquires the captured image from the imaging unit 101 (S602). Next, the image processing unit 102 cuts out a recognition range from the captured image on the basis of the correction information (S603). For example, the image processing unit 102 cuts out the recognition range at a predetermined size with the center shifted by the amount indicated by the correction information from the center of the captured image.

Next, the image processing unit 102 detects a vehicle by detecting a light spot of the vehicle from the recognition range on the basis of a luminance value (S604). However, since it is difficult to distinguish a signal, an electric bulletin board, or the like from the vehicle only with the luminance value, the vehicle and the others are discriminated from each other by a light spot size, a light spot movement direction, or the like. Then, a predetermined range around the detected light spot of the vehicle is regarded as an existing area of the vehicle.

Next, the image processing unit 102 outputs the coordinates of the existing area of the vehicle detected in S604 to the light distribution unit 104 (S605). Note that the coordinates are defined by the recognition range, and since the recognition range is defined using the correction information as described above, the correction information is reflected on the coordinates of the vehicle output to the light distribution unit 104.

Next, the light distribution unit 104 sets an irradiation pattern on the basis of the coordinates of the vehicle output from the image processing unit 102 (S606). The irradiation unit 105 emits a high beam according to the irradiation pattern set by the light distribution unit 104 (S607). The above is the description of the direct irradiation prevention process.

According to the above-described embodiment, the following operational effects can be obtained.

(1) The in-vehicle system S includes: the irradiation unit 105 that irradiates an area other than a set light-shielding range with light, the imaging unit 101 that images a range including an irradiation range of the light irradiated by the irradiation unit 105 to acquire a captured image; the object detection unit 254 that detects a non-target object which is not to be irradiated with the light from the captured image; the direct irradiation prevention unit 255 that calculates the light-shielding range on the basis of a position of the non-target object in the captured image and correction information and sets the light-shielding range in the irradiation unit 105, the correction-time light-shielding range setting unit 256 that sets the predetermined light-shielding range in the irradiation unit, and the correction calculation unit 257 that calculates the correction information on the basis of the captured image acquired by the acquisition unit when the correction-time light-shielding range setting unit 256 sets the light-shielding range in the irradiation unit 105.

Therefore, it is possible to cope with a deviation in a relative position of the irradiation unit 105 which is a headlight and the imaging unit 101 which is an in-vehicle camera. Specifically, even when the relative position between the irradiation unit 105 and the imaging unit 101 deviates from a design value, the correction calculation unit 257 calculates an amount of the deviation as the correction information, and the direct irradiation prevention unit 255 can adjust an irradiation position with reference to the correction information. In brief, the problem of hardware deviation, that is, the relative position between the irradiation unit 105 and the imaging unit 101 can be solved by software processing. Note that, in this embodiment, the light distribution unit 104 is interposed between the correction-time light-shielding range setting unit 256 and the irradiation unit 105. However, since the light distribution unit 104 merely instructs the irradiation unit 105 to irradiate a portion other than the light-shielding range designated by the correction-time light-shielding range setting unit 256, it can be said that the correction-time light-shielding range setting unit 256 substantially sets the light-shielding range in the irradiation unit 105.

(2) The correction calculation unit 257 outputs the calculated correction information to the direct irradiation prevention unit 255 via the storage unit 103. Therefore, the direct irradiation prevention unit 255 can use the correction information calculated by the correction calculation unit 257.

(3) The direct irradiation prevention unit 255 cuts out a recognition range from the captured image on the basis of the correction information, and sets the light-shielding range on the basis of the position of the non-target object in the recognition range.

(4) The correction-time light-shielding range setting unit 256 sets, as the light-shielding range, an area which is symmetrical with respect to a horizontal direction or an area which is symmetrical with respect to a vertical direction in front of the irradiation unit 105. Therefore, the correction information can be calculated without being affected by a change in ambient brightness.

(5) The correction device, that is, the image processing unit 102 is mounted on the vehicle 100 including the irradiation unit 105 that irradiates an area other than a set light-shielding range with light, and the imaging unit 101 that images a range including an irradiation range of the light emitted by the irradiation unit 105 to acquire a captured image. The image processing unit 102 includes the acquisition unit 251 that acquires the captured image from the imaging unit 101, the correction-time light-shielding range setting unit 256 that sets a predetermined light-shielding range in the irradiation unit 105, and the correction calculation unit 257 that calculates correction information on the basis of the captured image acquired by the acquisition unit 251 when the correction-time light-shielding range setting unit 256 sets the light-shielding range in the irradiation unit 105.

First Modification

In the above-described embodiment, the image processing unit 102 uses the correction information. However, the imaging unit 101 may use the correction information. For example, the calculated correction information may be stored in the imaging unit 101, and the imaging unit 101 may image only the recognition range 702 on the basis of the correction information and output the captured image to the image processing unit 102. In this case, the image processing unit 102 processes the correction information as zero in both vertical and horizontal directions in the embodiment.

According to this modification, the following operational effects can be obtained.

(6) The correction calculation unit 257 outputs the calculated correction information to the imaging unit 101. The imaging unit 101 determines a range to be output as the captured image on the basis of the correction information. Therefore, since the imaging range of the imaging unit 101 is narrowed, the time required for imaging and transfer of the captured image can be shortened. Furthermore, in this modification, the processing of the image processing unit 102 can be reduced.

Second Modification

In the above-described embodiment, the correction unit 252 performs correction separately in the vertical direction and the horizontal direction. However, the correction unit 252 may perform correction in the vertical direction and the horizontal direction by using a common light-shielding range.

Figure 16:
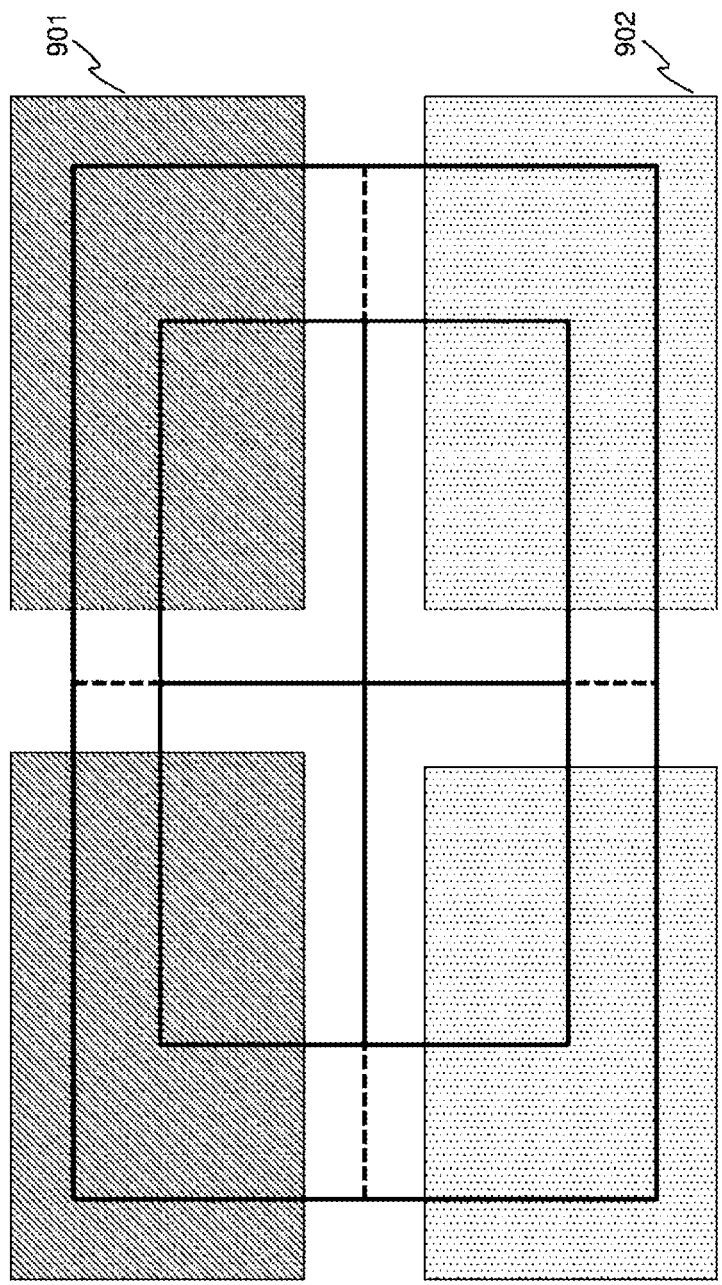
FIG. 16 is a view illustrating a light-shielding range at the time of correction in a second modification.

FIG. 16 is a view illustrating a light-shielding range at the time of correction in this modification. The light-shielding range in this modification has a shape similar to "+" that is a plus sign, such as a shape in which the shapes illustrated in FIGS. 10 and 12 are superimposed.

According to this modification, the following operational effects can be obtained.

(7) The correction-time light-shielding range setting unit 256 sets, as the light-shielding range, an area which is symmetrical with respect to the horizontal direction and the vertical direction in front of the irradiation unit 105. Therefore, by using this shape, the correction in the vertical direction and the horizontal direction can be performed at a time.

Third Modification

In the above-described embodiment, the image processing unit 102 cuts out the recognition range on the basis of the correction information in the direct irradiation prevention process. However, the image processing unit 102 may not cut out the recognition range. In this case, the image processing unit 102 calculates the coordinates of the vehicle by using the coordinate system in the captured image, then corrects the coordinates of the vehicle by using the correction information, and outputs the corrected coordinates to the light distribution unit 104.

According to this modification, the following operational effects can be obtained.

(8) The direct irradiation prevention unit 255 sets the light-shielding range by correcting the coordinates of the non-target object in the captured image on the basis of the correction information. Therefore, the image processing unit 102 can omit the processing of cutting out the recognition range.

Fourth Modification

The light-shielding range set by the correction-time light-shielding range setting unit 256 may not be symmetric with respect to the horizontal axis or the vertical axis in the front of the irradiation unit 105. That is, the correction-time light-shielding range setting unit 256 may set a left-right asymmetric or up-down asymmetric light-shielding range and calculate positive information. Even in this case, the correction calculation unit 257 can calculate the correction information on the basis of the captured image when the light-shielding range is known.

Figure 17:
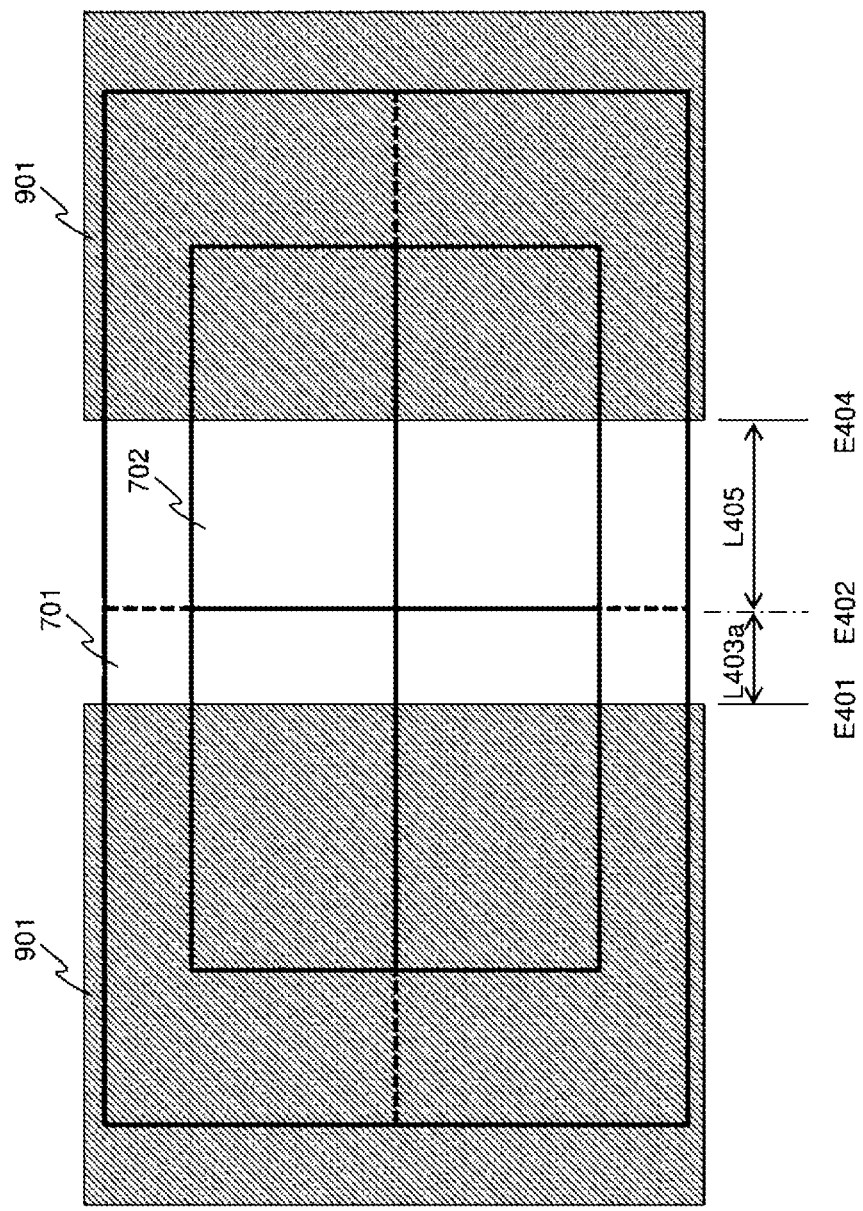
FIG. 17 is a view illustrating a light-shielding range at the time of correction in a fourth modification.

FIG. 17 is a view illustrating the light-shielding range at the time of correction in this modification. FIG. 17 illustrates the light-shielding range at the time of horizontal correction, and illustrates the light-shielding range which is not symmetric with respect to the vertical axis, that is, the left-right asymmetric light-shielding range. In the example illustrated in FIG. 17, in a case where there is no deviation in the horizontal direction, the light-shielding range is set such that a ratio between a distance L403a from the edge E401 to the center E402 of the irradiation area detected on the left side of the captured image 701 and the distance L405 from the edge E404 to the center E402 of the irradiation area detected on the right side of the captured image 701 is 1:2. Note that, although the example illustrated in FIG. 17 is the light-shielding range at the time of horizontal correction, the light-shielding range at the time of vertical correction may be similarly vertically asymmetric.

The correction may be performed only on one of the left and right headlights mounted on the vehicle 100, or the correction may be performed only on the high beam of the low beam and the high beam. In this case, the correction information can be calculated similarly to the embodiment by using the known imaging range of the imaging unit 101, that is, a viewing angle.

Fifth Modification

The light distribution unit 104 may be configured integrally with the irradiation unit 105.

Sixth Modification

The object detection unit 254 may detect an object other than the vehicle, for example, a pedestrian or a bicycle, by using a known method such as pattern matching.

Note that the present invention is not limited to the above-described embodiments, and various modifications are included. For example, the above-described embodiments have been described in detail for easy understanding of the present invention, and are not necessarily limited to those having all the described configurations.

Seventh Modification

Figure 18:
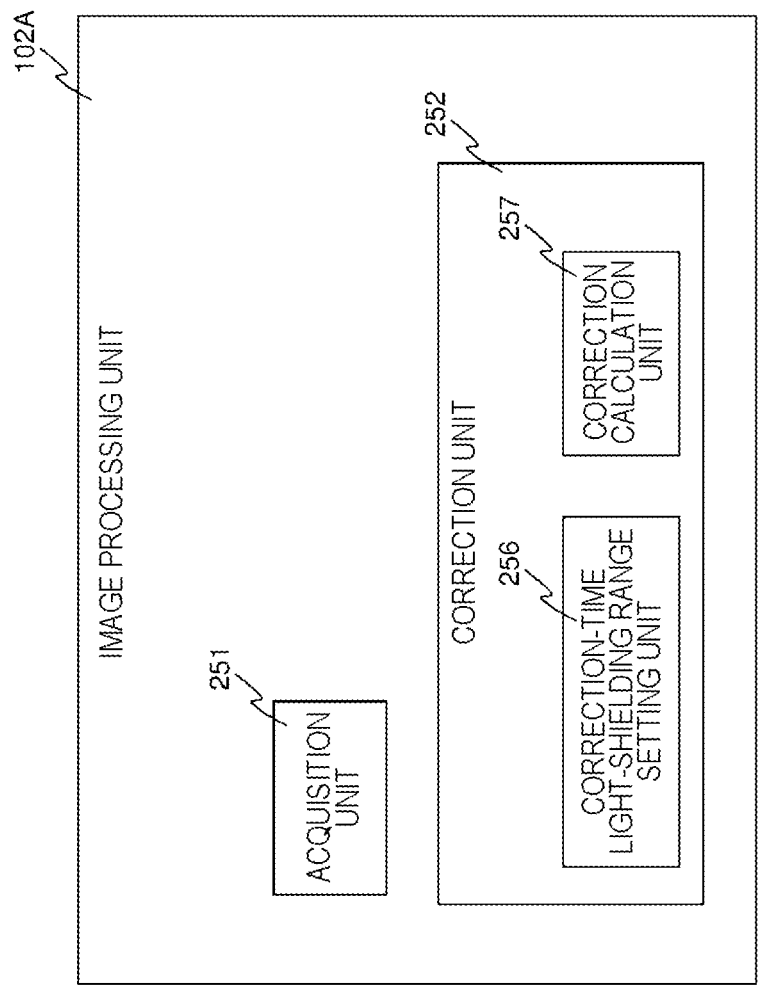
FIG. 18 is a block diagram illustrating a functional configuration of an image processing unit in a seventh modification.

The image processing unit may not include the object detection unit 254 and the direct irradiation prevention unit 255. In this case, for example, the light distribution unit 104 further includes the acquisition unit 251, the object detection unit 254, and the direct irradiation prevention unit 255. Then, the light distribution unit 104 executes the processing illustrated in FIG. 15. FIG. 18 is a block diagram illustrating a functional configuration of an image processing unit 102A in this modification. In FIG. 18, the object detection unit 254 and the direct irradiation prevention unit 255 are deleted as compared with FIG. 3.

According to this modification, the following operational effects are obtained.

(9) The image processing unit 102A which is a correction device is mounted on vehicle 100 including the irradiation unit 105 and the imaging unit 101. The image processing unit 102A includes the acquisition unit 251 that acquires a captured image from the imaging unit 101. The vehicle 100 further includes the light distribution unit 104 including the object detection unit 254 and the direct irradiation prevention unit 255. The image processing unit 102A which is the correction device further includes the correction-time light-shielding range setting unit 256 and the correction calculation unit 257. Therefore, it is possible to perform production at low cost by limiting the function of the image processing unit 102A which is the correction device.

Each of the above-described configurations, functions, processing units, processing means, and the like may be implemented by hardware by designing a part or all of them with, for example, an integrated circuit. In addition, each of the above-described configurations, functions, and the like may be implemented by software by a processor interpreting and executing a program for implementing each function. Information such as a program, a table, and a file for implementing each function can be stored in a recording device such as a memory, a hard disk, and a solid state drive (SSD), or a recording medium such as an SD card.

Control lines and information lines are described in consideration of necessity for the description, and all control lines and information lines in the product are not necessarily described. It may be considered that almost all the components are connected to each other in actual.

In the above-described embodiment and modifications, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

In the above-described embodiments and modifications, a program is stored in the ROM 203, but a program may be stored in the storage unit 103. In addition, the image processing unit 102 may include an input/output interface (not illustrated), and if needed, a program may be read from another device via the input/output interface and a medium that can be used by the image processing unit 102. Here, the medium refers to, for example, a storage medium detachable from the input/output interface, or a communication medium, that is, a wired, wireless, or optical network, or a carrier wave or a digital signal propagating through the network. In addition, some or all of the functions implemented by the program may be implemented by a hardware circuit or an FPGA.

The embodiments and modifications described above may be combined with each other. Although various embodiments and modifications have been described above, the present invention is not limited to these contents. Other embodiments considered within the scope of the technical idea of the present invention are also included within the scope of the present invention.

REFERENCE SIGNS LIST 100 vehicle
101 imaging unit
102 image processing unit
103 storage unit
104 light distribution unit
105 irradiation unit
106 vehicle control unit
107 vehicle information acquisition unit
108 alarm notification unit
109 traveling system control unit
251 acquisition unit
252 correction unit
254 object detection unit
255 direct irradiation prevention unit
256 correction-time light-shielding range setting unit
257 correction calculation unit

The invention claimed is:

1. An in-vehicle system comprising:
an irradiation unit that irradiates an area other than a set light-shielding range with light;
an imaging unit that images a range including an irradiation range of the light emitted by the irradiation unit to acquire a captured image;
an object detection unit that detects a non-target object which is not to be irradiated with the light from the captured image;
a direct irradiation prevention unit that calculates the light-shielding range on a basis of a position of the non-target object in the captured image and correction information, and sets the light-shielding range in the irradiation unit, wherein the light-shielding range comprises a predetermined angle range;
a correction-time light-shielding range setting unit that sets, as the predetermined light-shielding range in the irradiation unit, an area which is symmetrical with respect to at least one of a horizontal direction and a vertical direction in front of the irradiation unit, wherein the area is set with respect to the horizontal direction based on a horizontal correction amount when the correction information comprises a horizontal deviation, and wherein the area is set with respect to the vertical direction based on a vertical correction amount when the correction information comprises a vertical deviation; and
a correction calculation unit that calculates the correction information on a basis of the captured image when the correction-time light-shielding range setting unit sets the light-shielding range in the irradiation unit, wherein the correction information is calculated based on a deviation between a center position of the captured image of the imaging unit and a center position of the irradiation range of the irradiation unit, and wherein the deviation is at least one of the horizontal deviation or the vertical deviation.

2. The in-vehicle system according to claim 1, wherein the correction calculation unit outputs the calculated correction information to the direct irradiation prevention unit.

3. The in-vehicle system according to claim 2, wherein the direct irradiation prevention unit cuts out a recognition range from the captured image on a basis of the correction information, and sets the light-shielding range on a basis of the position of the non-target object in the recognition range.

4. The in-vehicle system according to claim 2, wherein the direct irradiation prevention unit sets the light-shielding range by correcting coordinates of the non-target object in the captured image on a basis of the correction information.

5. The in-vehicle system according to claim 1, wherein the correction calculation unit outputs the calculated correction information to the imaging unit, and the imaging unit determines a range to be output as the captured image on a basis of the correction information.

6. A correction device which is mounted on a vehicle including an irradiation unit that irradiates an area other than a set light-shielding range with light and an imaging unit that images a range including an irradiation range of the light emitted by the irradiation unit to acquire a captured image, the correction device comprising:

an acquisition unit that acquires the captured image from the imaging unit;

an object detection unit that detects a non-target object which is not to be irradiated with the light from the captured image;

a direct irradiation prevention unit that calculates the light-shielding range on a basis of a position of the non-target object in the captured image and correction information, and sets the light-shielding range in the irradiation unit, wherein the light-shielding range comprises a predetermined angle range;

a correction-time light-shielding range setting unit that sets, as the predetermined light-shielding range in the irradiation unit, an area which is symmetrical with respect to at least one of a horizontal direction and a vertical direction in front of the irradiation unit, wherein the area is set with respect to the horizontal direction based on a horizontal correction amount when the correction information comprises a horizontal deviation, and wherein the area is set with respect to the vertical direction based on a vertical correction amount when the correction information comprises a vertical deviation; and a correction calculation unit that calculates the correction information on a basis of the captured image acquired by the acquisition unit when the correction-time light-shielding range setting unit sets the light-shielding range in the irradiation unit, wherein the correction information is calculated based on a deviation between a center position of the captured image of the imaging unit and a center position of the irradiation range of the irradiation unit, and wherein the deviation is at least one of the horizontal deviation or the vertical deviation.

7. A correction device which is mounted on a vehicle including an irradiation unit that irradiates an area other than a set light-shielding range with light and an imaging unit that images a range including an irradiation range of the light emitted by the irradiation unit to acquire a captured image, the correction device comprising:

an acquisition unit that acquires the captured image from the imaging unit, wherein the vehicle further includes an object detection unit that detects a non-target object which is not to be irradiated with the light from the captured image, and a direct irradiation prevention unit that calculates the light-shielding range on a basis of a position of the non-target object in the captured image and correction information and sets the light-shielding range in the irradiation unit, wherein the light-shielding range comprises a predetermined angle range;

a correction-time light-shielding range setting unit that sets, as the predetermined light-shielding range in the irradiation unit, an area which is symmetrical with respect to at least one of a horizontal direction and a vertical direction in front of the irradiation unit, wherein the area is set with respect to the horizontal direction based on a horizontal correction amount when the correction information comprises a horizontal deviation, and wherein the area is set with respect to the vertical direction based on a vertical correction amount when the correction information comprises a vertical deviation; and a correction calculation unit that calculates the correction information on a basis of the captured image acquired by the acquisition unit when the correction-time light-shielding range setting unit sets the light-shielding range in the irradiation unit, wherein the correction information is calculated based on a deviation between a center position of the captured image of the imaging unit and a center position of the irradiation range of the irradiation unit, and wherein the deviation is at least one of the horizontal deviation or the vertical deviation.

\* \* \* \* \*